US010457145B1

(12) United States Patent
Qiao et al.

(10) Patent No.: US 10,457,145 B1
(45) Date of Patent: Oct. 29, 2019

(54) METHOD OF DETERMINING AND PREVENTING A DRIVER MISUSE IN A REAR AUTOMATIC BRAKING SYSTEM

(71) Applicant: Continental Automotive Systems, Inc., Auburn Hills, MI (US)

(72) Inventors: Ningsheng Qiao, Troy, MI (US); Jeremy McClain, Ortonville, MI (US); Diego German Canedo Texon, Zapopan (MX); Berenice Sanvicente Herrera, Tlajomulco de Zuniga (MX)

(73) Assignee: Continental Automotive Systems, Inc., Auburn Hills, MI (US)

(*) Notice: Subject to any disclaimer, the term of this patent is extended or adjusted under 35 U.S.C. 154(b) by 0 days.

(21) Appl. No.: 16/174,979

(22) Filed: Oct. 30, 2018

(51) Int. Cl.
| | |
|---|---|
| *B60K 28/06* | (2006.01) |
| *B60W 40/09* | (2012.01) |
| *B60W 50/14* | (2012.01) |
| *G07C 5/08* | (2006.01) |
| *B60W 30/09* | (2012.01) |
| *B60W 30/18* | (2012.01) |
| *B60W 40/08* | (2012.01) |
| *B60W 10/18* | (2012.01) |

(52) U.S. Cl.
CPC ............ *B60K 28/066* (2013.01); *B60W 40/09* (2013.01); *B60W 50/14* (2013.01); *B60W 10/18* (2013.01); *B60W 30/09* (2013.01); *B60W 30/18036* (2013.01); *B60W 2040/0863* (2013.01); *G07C 5/0808* (2013.01)

(58) Field of Classification Search
CPC ..... B60K 28/066; B60W 40/09; B60W 50/14; B60W 30/09; B60W 30/18036; B60W 2040/0863; G07C 5/0808
See application file for complete search history.

(56) References Cited

U.S. PATENT DOCUMENTS

2013/0131907 A1    5/2013   Green et al.

*Primary Examiner* — Brian A Zimmerman
*Assistant Examiner* — Sara B Samson

(57) ABSTRACT

Driver misuse of an automatic braking system is determined by comparing the amount of time that a vehicle moves rearwardly until it is stopped, to the amount of time after the last actuation of a brake pedal and when the vehicle is stopped. If the ratio of no brake applied time to the total reverse time is greater than a predetermined value, the automatic braking system is considered to have been misused. Each misuse occurrence increments a counter that is stored in a non-transitory memory device.

1 Claim, 2 Drawing Sheets

METHOD OF DETERMINING AND PREVENTING A DRIVER MISUSE IN A REAR AUTOMATIC BRAKING SYSTEM

BACKGROUND

Rear automatic braking systems alert a driver of potential hazards while the vehicle is reversing. It also applies automatic braking to avoid or mitigate collisions with objects behind the vehicle. Such a system is referred to as a SAE level 1 driving automation system, which means that while it is capable of avoiding some collisions within its control and capabilities it cannot avoid all possible collisions.

In an SAE level 1 driving automation system, the driving mode specific execution by a driver assistance system of either steering or acceleration using information about the driving environment and with the expectation that the human driver performs all remaining aspects of a driving task, the driver assist system and the driver both have responsibilities for stopping the vehicle when it is in reverse.

Some drivers tend to rely completely on a driver assistance system while driving in reverse. It is considered a misuse of such a system for a driver to rely on it to prevent a rear-traveling collision. A method and apparatus to detect when a driver is misusing a rear automatic braking system would be an improvement over the prior art.

DETAILED DESCRIPTION

Figure 2:
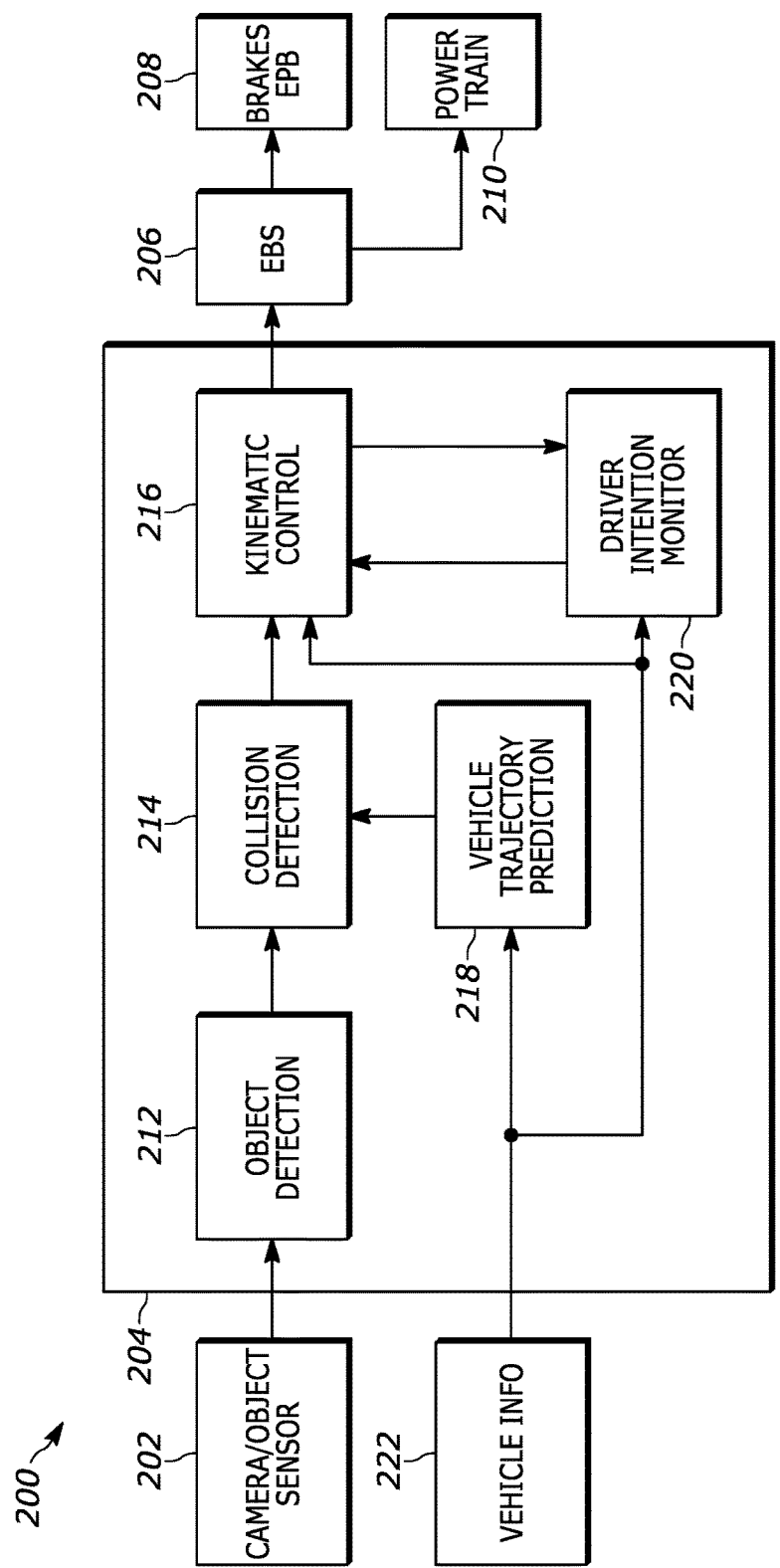
FIG. 2 is a block diagram of an automatic braking system which contains five main functional blocks: an object detector; a collision detector; a vehicle trajectory predictor; a driver intention monitor; and a kinematic controller.

Referring first to FIG. 2, an apparatus 200 to detect driver misuse of an automatic braking system comprises a rearward-facing camera 202, the output of which is provided to a processor 204. The processor 204 is coupled to a non-transitory memory device, which are devices are well known to those of ordinary skill in the computer arts and thus omitted from FIG. 2 in the interest of brevity. Any appropriate memory device for the processor 204 in FIG. 2 has is provided with program instructions, which when executed cause the processor to perform the various functions shown in FIG. 2. Those functions are "nominalized" in FIG. 2 of this disclosure.

In FIG. 2, the camera output is provided to an object detector 212, which uses raw data from the camera 202 to produce a "list" or set of objects detected by the camera 202 as being located behind the vehicle. The detector 212 represents each object by its detected size, as represented by its size in the image captured by the camera, e.g., by the number of pixels filled or occupied by the object's image, and its position relative to the vehicle.

A vehicle information database 222 stores and provides information about the vehicle's physical characteristics including wheel base, stopping distances and handling characteristics. That information is provided to or made available to a vehicle trajectory predictor 218.

The vehicle trajectory predictor 218 uses information from the vehicle data 222 that includes steering wheel angle, steering wheel angle gradient, vehicle velocity, and vehicle acceleration to calculate the vehicle's expected path.

A collision detector 214 uses the information from the object detector 212 and the vehicle trajectory predictor 218 to evaluate the likelihood or risk of collision with an object behind the vehicle. The object with the highest likelihood of a collision is identified and provided to a kinematic controller 216.

The driver intention monitor 220 uses the same vehicle data but also including acceleration and the brake pedal location to monitor or detect driver misuse as well as driver acceleration.

The kinematic controller 218 calculates a braking profile that will avoid or mitigate collision with the object detected by the collision detector 214. The kinematic controller thus commands the brakes to execute that braking profile to avoid a collision.

The EBS or electronic braking system 206 has an output which is connected to the vehicle's electronic parking braking system 208. It also provides signals to the vehicle power train 210 to moderate the engine torque output or transmission gear range.

Figure 1:
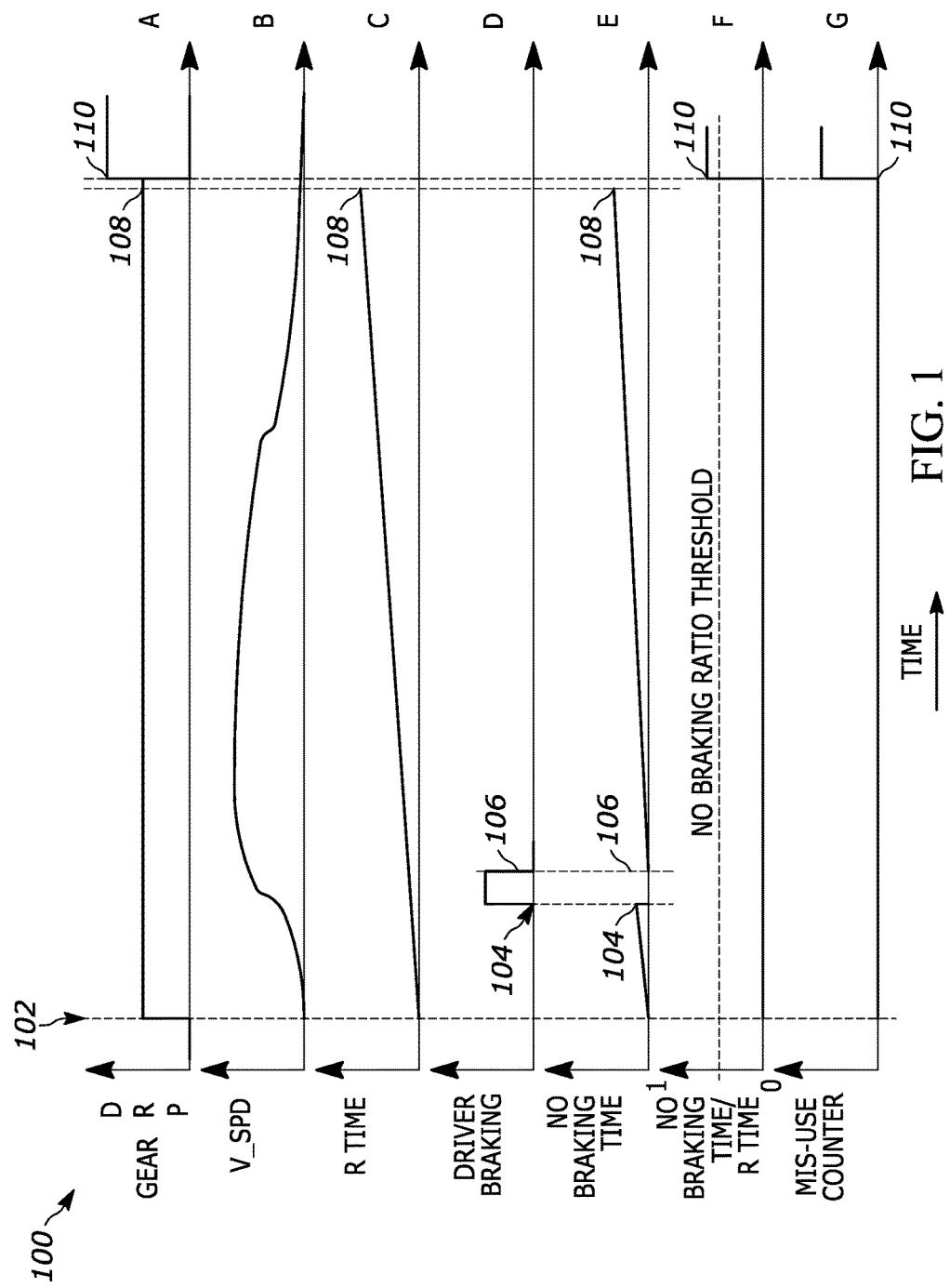
FIG. 1 depicts time lines of signals provided to the apparatus of FIG. 2 depicting events required to provide method of detecting driver misuse of an automatic braking system and thus which depict the steps of such a method.

Referring now to FIG. 1, a method of determining driver misuse begins with detecting when the transmission gear is shifted from the park position to the rear or reverse position at step 102. See in particular the uppermost timeline, which is also denominated as "A" on the right-hand side of FIG. 1.

Timeline "B" represents the vehicle's relative speed in the rearward direction. The vehicle's speed begins to increase in the rearward direction shortly after the transmission gear is shifted from park to reverse at step 102. The vehicle's rearward speed increases gradually, but eventually tapers off and goes to zero at step 110 at which time the transmission gear is shifted to either Drive or Park.

Timeline "C" depicts the total amount of vehicle reverse time, t, which the transmission gear is in the reverse position. Time C thus represents a first timer that is considered herein to be a "total reverse timer" and which is an accumulator, of the total amount of time that the vehicle transmission gear is in reverse and the vehicle is moving rearwardly, as which is shown as occurring between 102 and 108.

At 102, the total amount of time that the transmission is in reverse is zero and increases linearly to 108, which is the time at which the transmission gear is in reverse and vehicle reverse speed is zero.

Timeline "D" represents a driver braking occurrence at 104 and which persist until 106. Stated another way, at t=104, a brake pedal is depressed and released a short time later at 106.

In timeline "E" the amount of time that the vehicle is traveling in reverse, after the transmission gear is shifted to reverse or after a brake pedal actuation, is accumulated. Timeline E thus represents a timer for the amount of time that the vehicle travelled rearwardly without a brake pedal applied, i.e., it is a no brake applied timer.

At 104, a brake pedal is actuated. The "no brake applied" time is thus reset to zero. At 106, the brake is released; the no brake applied timer depicted in timeline E begins accumulating a "no brake applied" time until 108. Time line "E" thus represents a second or "no brake applied timer" that is a tabulation of the time that the transmission gear is in reverse, with the vehicle moving rearwardly and without the brake pedal being depressed.

In FIG. 1, timeline "F" depicts the calculation of a ratio of the no brake applied timer, i.e., the total amount of time that the vehicle travelled rearwardly without a brake pedal actuation, to the total reverse timer, i.e., the total amount of time that the vehicle transmission was in reverse. The calculation of the ratio of the no brake applied timer to the total reverse timer occurs at 110, which is the time at which the vehicle transmission is shifted from the reverse position to either the drive or park position and corresponds to when the vehicle is presumed to have stopped moving backward.

Lastly, timeline "G" simply represents the occurrence of a incrementing of a counter of instances when the ratio of the no brake applied timer to the total reverse timer is greater than a predetermined value. The counter of the instance of when the no brake applied timer to the total reverse timer is greater than a predetermined value is implemented by and thus a part of the processor 204 shown in FIG. 2

Put simply, the timelines and graphs of FIG. 1 depict the calculation of the time that a driver operates a vehicle in reverse without applying a brake pedal. For example, if no brake pedal is applied by a driver between the time that the vehicle starts moving rearwardly at 102 and when it stops at 110, the method of detecting misuse presumes that the vehicle's rearward movement at 110 was stopped by the vehicle's automatic braking system, not by the driver, which is considered herein as an instance of misuse.

Similarly, if a brake pedal is applied by a driver at 104 and the brake pedal is released at 106, the method of detecting misuse presumes that the vehicle's rearward movement at 110 was stopped by the vehicle's automatic braking system, not by the driver, because the time between 102 and 104 is significantly less than the time between 106 and 110.

If a driver does not attempt to slow the rearwardly moving vehicle prior to the vehicle stopping itself, the driver's failure to do so is considered a misuse of the automatic braking assist system. If on the other hand the driver at least taps the brakes once prior to the vehicle being stopped, the method assumes that the driver is not misusing the system if the brakes were applied at least halfway between the starting point and ending point of the reverse vehicle travel. In the preferred embodiment, the ratio of no brake applied time to total reverse time less than 0.5 was considered to be a misuse by the driver.

Still referring to FIG. 1, and as noted above, in timeline G, a counter is incremented on each occurrence of a driver misuse determination. In a preferred embodiment, the increasing count of driver misuse on each occurrence is tabulated and stored in a non-transitory memory location of the processor 204. As the number of misuse reversals accumulates, a warning is provided to the driver via a dashboard display thus notifying the driver that the automatic braking assistance system is being misused.

The foregoing description is for purposes of illustration only. The true scope of the invention is set forth in the following claims.

What is claimed is:

1. A method of determining and preventing driver misuse in a rear automatic braking system of a motor vehicle having an automatic transmission and a brake pedal, the method comprising:

a. detecting the automatic transmission being shifted to reverse;

b. detecting rearward movement of the vehicle after the transmission is shifted to reverse;

c. if the vehicle is detected as moving rearwardly after the transmission is shifted to reverse, starting a first timer, the first timer being a total reverse timer and which is a tabulation of the total amount of time that the transmission is in reverse;

d. when the first total reverse timer is started, simultaneously starting a second timer, the second timer being a no brake applied timer, which is a tabulation of the time that the transmission is in reverse with the vehicle moving rearwardly without the brake pedal being depressed;

e. after the second timer is started and while the vehicle is moving rearwardly detecting a vehicle brake actuation;

f. when the vehicle brake is actuated, stopping the second, no brake applied timer;

g. detecting when rearward movement of the vehicle has stopped responsive to brake actuation and thereafter, detecting the automatic transmission being shifted from reverse to either drive or park;

h. when rearward movement has stopped and when the transmission has been shifted to either park or drive, dividing the value of the second, no brake applied timer by the value of the first, total reverse Method of Determining and Preventing a Driver Misuse in a Rear Automatic Braking System timer to obtain a ratio of the no brake applied time to the total reverse time;

i. determining whether the ratio of the no brake applied time to the total reverse time is greater than a predetermined threshold value;

j. incrementing a no brake assist counter when the ratio of the no brake applied time to the total reverse time is less than a predetermined threshold value;

k. storing the value of the no brake assist counter in a non-transitory memory device;

l. repeating steps a.-j. each time the vehicle transmission is shifted to reverse;

m. when the no brake assist counter value exceeds a second predetermined threshold, displaying an alarm message on an indicator visible to an operator of the motor vehicle.

* * * * *